United States Patent Office 3,308,121
Patented Mar. 7, 1967

3,308,121
3-MORPHOLINONES, THIONES AND
5,6 OXAZINES
Walter Francis Gannon, Evanston, Ill., and George Ireland Poos, Ambler, Pa., assignors to McNeil Laboratories, Inc., a corporation of Pennsylvania
No Drawing. Filed Mar. 22, 1965, Ser. No. 441,925
26 Claims. (Cl. 260—244)

This application is a continuation-in-part application of our copending application Serial No. 152,086, filed November 13, 1961, now abandoned.

This invention relates to a new series of organic compounds. More particularly, the invention concerns certain novel 3-morpholinone and morpholine-3-thione derivatives which may be represented by the following structural formula:

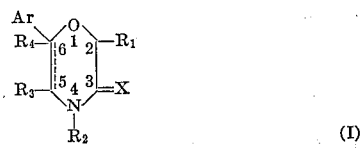

The novel compounds of this invention are useful as muscle relaxants and tranquilizers. In the above general representation, X is a member selected from the group consisting of oxygen and sulfur; $R_1$ is a member selected from the group consisting of hydrogen, hydroxy, lower alkyl and aryl, provided that, when $R_1$ is hydroxy, said X is oxygen; $R_2$ is a member selected from the group consisting of hydrogen, lower alkyl, amino-lower alkyl, lower alkyl-amino-lower alkyl, acyl and aryl, provided that, when $R_2$ is acy, said X is oxygen and $R_1$ is hydrogen, lower alkyl or aryl; $R_3$ is a member selected from the group consisting of hydrogen, lower alkyl and aryl; $R_4$ is a member selected from the group consisting of hydrogen, lower alkyl and aryl; Ar is aryl; and the dotted line between the 5- and 6-carbon atoms indicates the presence of an optional double bond with Ar the sole substituent in the 6-position, provided that, when said double bond is present, $R_1$ is other than hydroxy. When X is oxygen, the corresponding saturated compounds may be denoted as 2-$R_1$-4-$R_2$-5-$R_3$-6-$R_4$-6-Ar-3-morpholinones. When X is sulfur, the corresponding saturated compounds may be denoted as 2-$R_1$-4-$R_2$-5-$R_3$-6-$R_4$-6-Ar-morpholine-3-thiones.

More specifically, with respect to the designated substituents on the morpholine nucleus and as used herein, lower alkyl includes saturated branched or straight chain carbon-carbon linkages containing from 1 to 7 carbon atoms, including methyl, ethyl, propyl, isopropyl, butyl, isobutyl, heptyl, hexyl and the like; haloalkyl groups such as trifluoromethyl, chloromethyl and the like; aminoalkyl groups such as 2-aminoethyl, 3-methylaminopropyl, 3-dimethylamino-2-pentyl and the like; and lower alkoxy-lower alkyl groups such as 2-ethoxyethyl, 3-methoxypropyl and the like. Aryl is preferably a monocyclic aryl such as phenyl which may be, if desired, substituted by one or more groups. Such groups include, for example, hydroxy; lower alkyl; halo-lower alkyl as, for example, trifluoromethyl; lower alkoxy as, for example, methoxy, ethoxy, propoxy, butoxy, isobutoxy and the like; aryl-lower alkoxy such as phenylmethoxy; halo such as chloro or fluoro; nitro; amino and lower alkylamino; and cyclic ethers such as methylenedioxy. The Ar substituents, in addition to the phenyl and substituted phenyl groups indicated above, may be, if desired, polycyclic aryl groups such as naphthyl and fluorenyl, or heterocyclic groups containing from 4 to 5 carbon atoms interrupted by oxygen, nitrogen or sulfur linkages such as, for example, pyrrolidyl, piperidyl, morpholyl, thiamorpholyl, pyridyl, thienyl, furyl, piperazinyl and the like. The term acyl includes aliphatic, aromatic and heterocyclic acyls. Typical of the acyls that are operable herein are the lower alkylcarbonyls, e.g., acetyl, propionyl, butyryl and the like; benzoyl and substituted benzoyl such as trifluoromethylbenzoyl, halobenzoyl, and the like; phenylacetyl; diphenylacetyl; furoyl; and the like.

The compounds of this invention wherein X is oxygen, $R_1$ is other than hydroxy, $R_2$ is other than acyl and a single bond exists between the 5- and 6-carbon atoms are conveniently prepared by converting the appropriate amino alcohol (II) to its alkali metal salt (III) by re-action with an alkali metal or alkaline earth metal base, for example, a hydride, amide or alkoxide. Sodium hydride is especially useful for this purpose. Treatment of (III) with an appropriate halo alkyl ester gives an ether linkage (IV) by displacement of the halogen. Cyclization to the lactam (V) occurs by splitting out the alkanol, the reaction being advantageously conducted in the presence of an inert organic solvent such as a hydrocarbon solvent for example, benzene, toluene, xylene, hexane, heptane and the like. The reaction scheme may be illustrated by the following flow chart:

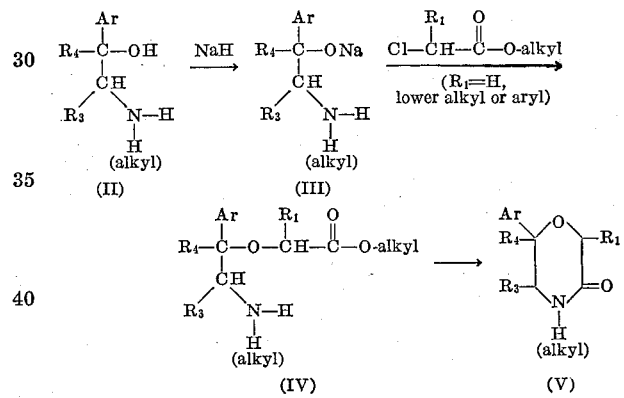

An alternative method for obtaining the above compounds (V) comprises reacting the amino alcohol (II) with an acylating agent such as the halide or anhydride of an appropriately α-halo-substituted acid (VI) to give the corresponding amide (VII) which, on treatment with a base such as an alkali metal or alkaline earth metal hydroxide, yields the desired lactam (V). The reaction scheme may be illustrated as follows:

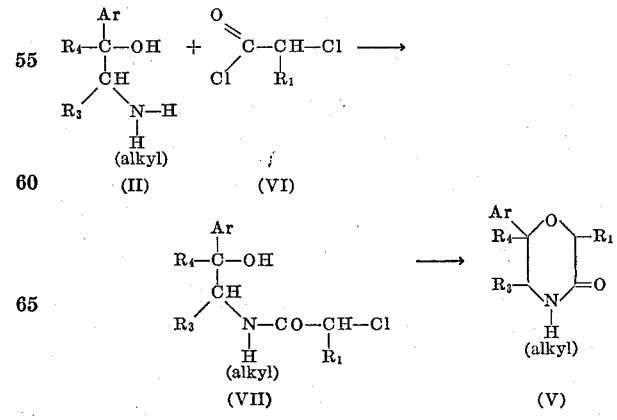

Introduction of a lower alkyl or substituted lower alkyl in the 4-position of the morpholine nucleus, i.e., onto the ring nitrogen, may be alternatively accomplished by treatment of the corresponding 4-unsubstituted compounds of Formula V with an appropriate alkylating agent, such as a lower alkyl halide or substituted lower alkyl halide, e.g., the bromide or chloride, in the presence of a strong base, e.g., sodium amide or sodium hydride under reflux conditions in a suitable inert organic solvent such as the aromatic hydrocarbons, e.g., benzene, toluene, xylene and the like.

Acylation of the compounds of Formula V, wherein the ring nitrogen is unsubstituted, i.e., where $R_2$ is hydrogen, is accomplished by conventional acylation techniques. Typical acylating agents include the anhydrides of lower aliphatic acids, e.g., acetic anhydride, propionic anhydride, n-butyric anhydride, isobutyric anhydride, valeric anhydride and the like. Acid halides may also be used advantageously as the acylating agent, e.g., acetyl chloride, butyryl chloride, benzoyl chloride, substituted benzoyl chlorides, phenylacetyl chloride, furoyl chloride and the like. The acylation reaction may be carried out in the presence of a base and a variety of anhydrous nonhydroxylic solvents such as benzene, toluene, chloroform, methylene chloride, tetrahydrofuran, diethylether, etc.

Introduction of a hydroxy group in the 2-position of the morpholine nucleus of compounds (V) is accomplished by acylating the amino alcohol (II) with a dihaloacetyl halide, such as dichloroacetyl chloride (VIII), in the presence of dilute alkali to yield the corresponding acetamides such as (IX) which, on subsequent treatment with an organic amine base, such as morpholine, preferably under reflux conditions in a dry hydrocarbon solvent such as benzene, toluene, xylene, etc., afford the corresponding 2-morpholino-3-morpholinones (X). Conventional acid hydrolysis of the latter readily yields the desired 2-hydroxy-3-morpholinones (XI). Alternatively, the dihaloacetamides such as (IX) may be converted directly to (XI) by treatment with an alkali metal base such as sodium bicarbonate, potassium carbonate, sodium hydroxide and the like. The reaction schemes are illustrated below.

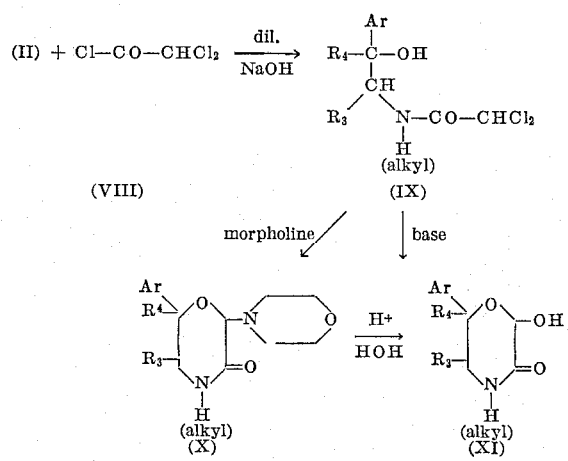

Those compounds wherein X is oxygen, $R_1$ is other than hydroxy, $R_2$ is other than acyl, and a double bond exists between the 5- and 6-carbon atoms of the morpholine nucleus, may be obtained by acylating a keto compound of Formula XII, with an acylating agent, such as the halide or anhydride of an appropriately α-halo-substituted acid, under conventional acylating conditions to give the corresponding amide (XIII). Subsequent treatment with base, such as alkali metal hydroxides and alkoxides, e.g., sodium hydroxide, potassium tert-butoxide, and the like, and, preferably, a strongly basic ion exchange resin, such as a polystyrene quaternary ammonium resin and the like, results in cyclization of (XIII) to yield the desired compounds (XIV). The reaction scheme is illustrated below.

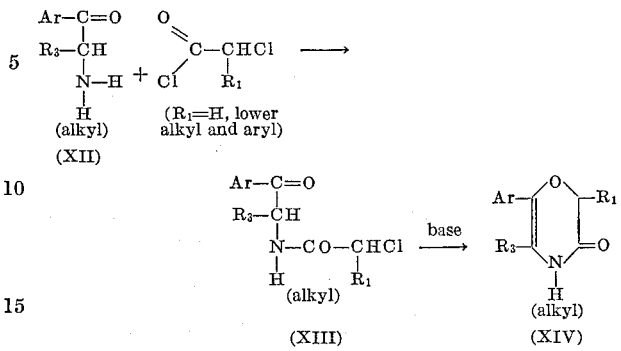

An alternate method of preparing the N-lower alkyl compounds of (XIV) is by alkylation of the corresponding N-unsubstituted compounds of (XIV). Conventional acylation of the latter also affords the corresponding N-acyl derivatives thereof. Hydrogenation of the 5,6-double bond such as, for example, by means of hydrogen catalytically activated by platinum, palladium or nickel catalyst, affords the corresponding saturated morpholinones of this invention.

Replacement of the oxo function on the 3-position of the morpholine ring with sulfur is suitably effected by treatment of the appropriate 3-morpholinone with phosphorous pentasulfide at temperatures generally at or above room temperature and, preferably, in the presence of pyridine. This reaction is particularly advantageous in converting the 3-morpholinones of Formula XV to the corresponding morpholine-3-thiones of Formula XVI wherein $R_1$, $R_2$, $R_3$ and $R_4$ are each a member selected from the group consisting of hydrogen, lower alkyl and aryl; and when the double bond is present between the 5- and 6-carbon atoms, Ar is the sole substituent in the 6-position.

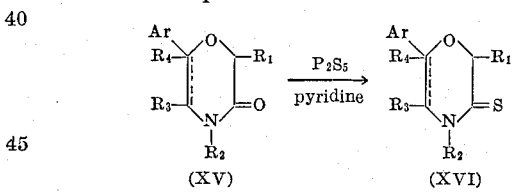

Depending upon the starting materials obtained, the substituents on the morpholinone ring may be either in the "cis" or "trans" configuration with respect to one another in 3-dimensional representation. It is to be understood, therefore, that the novel compounds as generically described and claimed are intended to embrace both configurations, it being well within the purview of one skilled in the art to determine which end configuration is desired by initiating the process with the appropriate starting product. The examples given below are, therefore, to be understood as illustrations of discrete species, not as limitations upon the scope of the invention or as restrictive exemplifications of "cis" or "trans" configurations of a given compound.

Example I

To a suspension of 50 parts by weight of α-(1-aminoethyl)-benzyl alcohol (dl-norephedrine) in 500 parts by volume of benzene is added, in portions, 24 parts by weight of 50% sodium hydride dispersion. The mixture is stirred for one hour. Then a solution containing 43 parts by weight of freshly distilled ethyl chloroacetate in 50 parts by volume of benzene is added. The addition requires fifteen minutes. The resultant clear solution is stirred for one hour. After the first half-hour, a solid precipitates. This suspension is treated with enough water to dissolve the solid. The mixture is extracted with 5% aqueous hydrochloric acid solution. The acid solution is back-extracted with ether. The ether and benzene portions are combined, dried with anhydrous magnesium sulfate and concentrated under reduced pressure. The resultant oily solid is washed with a small amount of ether and collected. There is obtained 54.4 parts by weight (87%) of solid product. Two recrystallizations from ethyl acetate give pure cis-5-methyl-6-phenyl-3-morpholinone, melting point 138° C.–140.5° C.

*Example II*

A mixture of 21.3 parts by weight of norpseudoephedrine, 6.7 parts by weight of 50% sodium hydride dispersion and 200 parts by volume of benzene is refluxed for four hours and then cooled. To this suspension is added a solution containing 24.5 parts by weight of freshly distilled ethyl chloroacetate in 80 parts by volume of benzene. The resultant mixture is stirred for one hour, then extracted with 5% aqueous hydrochloric acid solution and water. The aqueous portions are back-extracted with ether. The benzene and ether portions are combined, dried with anhydrous magnesium sulfate and concentrated under reduced pressure. The resultant oily solid is treated with a small amount of ether, and the resulting solid product is collected by filtration. There is obtained 16.8 parts by weight of white solid. One recrystallization from ethyl acetate gives 15.0 parts by weight (57%) of trans-5-methyl-6-phenyl-3-morpholinone, melting point 168° C.–171° C.

*Example III*

Phenethanolamine hydrochloride (20 parts by weight) is dissolved in 10% aqueous sodium hydroxide solution and quickly extracted with two portions of ether. The combined ether portions are dried with anhydrous magnesium sulfate and concentrated under a Vigreux column. The residual free base is taken up in 200 parts by volume of benzene, and to it is added, in portions, 8.3 parts by weight of 50% sodium hydride dispersion. The mixture is stirred for 0.5 hour. Then a solution containing 14 parts by weight of distilled ethyl chloroacetate in 100 parts by volume of benzene is added. The mixture is stirred for two hours, extracted with 5% aqueous hydrochloric acid solution and water. The aqueous phase is back-extracted with ether. The ether and benzene portions are combined, dried with anhydrous magnesium sulfate, and concentrated under reduced pressure. The residual solid is treated with a small amount of ether and collected. There is obtained 11.1 parts by weight (54%) of white solid. One recrystallization from ethyl acetate gives 6.6 parts by weight (32%) of pure 6-phenyl-3-morpholinone, melting point 108° C.–109.5° C.

*Example IV*

To a mixture of 20 parts by weight of 1-ephedrine alkaloid in 200 parts by volume of benzene is added 9 parts by weight of 50% sodium hydride dispersion. The mixture is stirred for one hour. To it is added a solution containing 15 parts by weight of distilled ethyl chloroacetate in 100 parts by volume of benzene. The mixture is stirred for one hour and then extracted with 5% aqueous hydrochloric acid solution. The acid solution is back-extracted with methylene chloride. The methylene chloride and benzene portions are combined, dried over anhydrous magnesium sulfate and concentrated under reduced pressure. The residual oil is passed over alumina to remove mineral oil. The oil is then distilled twice giving 11.2 parts by weight (45%) of 4,5-dimethyl-6-phenyl-3-morpholinone, boiling point 117° C.–120° C. (0.1 mm.), $n_D^{23}$ 1.5428.

*Example V*

To a solution of 15.7 parts by weight of α-(1-aminomethyl)-p-methoxybenzyl alcohol in 160 parts by volume of benzene is added 7.0 parts by weight of 50% sodium hydride dispersion. The mixture is stirred for 0.5 hour. Then a solution containing 11.8 parts by weight of distilled ethyl chloroacetate in 120 parts by volume of benzene is added. The resultant mixture is stirred for two hours, then extracted with 5% aqueous hydrochloric acid. The aqueous portion is back-extracted with ether. The benzene and ether are combined, dried over anhydrous magnesium sulfate and concentrated under reduced pressure. The residual solid is treated with a small amount of ether and collected. One recrystallization from ethyl acetate gives 6.1 parts by weight (30%) of pure 6-(p-methoxyphenyl)-3-morpholinone, melting point 151.8° C.–152.8° C.

*Example VI* dl-Norephedrine (20 parts by weight) is added to a solution containing 5.8 parts by weight of sodium hydroxide in 150 parts by volume of water. The mixture is cooled, and to it is added in portions, with vigorous shaking, 27.4 parts by weight of α-chloro-phenylacetyl chloride. The resulting solid is collected by filtration and washed thoroughly with water and dried. The solid is triturated with ether and collected. One recrystallization from ethanol gives 6.8 parts by weight (17%) of 2-chloro-N-(β-hydroxy-α-methylphenethyl)-2-phenylacetamide, melting point 150° C.–152° C.

*Example VII*

To a solution containing 0.44 part by weight of potassium hydroxide in 20 parts by volume of absolute ethanol is added 2.37 parts by weight of 2-chloro-N-(β-hydroxy-α-methylphenethyl)-2-phenylacetamide. The mixture is stirred for four hours. Potassium chloride is removed by filtration, and the filtrate is concentrated under reduced pressure. The residual material is crystallized from an ether-petroleum ether mixture. Two recrystallizations from ethyl acetate give 2,6-diphenyl-5-methyl-3-morpholinone, melting point 177° C.–182° C.

*Example VIII*

A solution of 11.2 g. (0.28 mole) of sodium hydroxide in 150 ml. of water is added to a solution of 20 g. (0.0885 mole) of α-aminomethyl benzhydrol in 200 ml. of methylene chloride. The mixture is cooled and stirred and 10.0 g. (0.089 mole) of chloroacetyl chloride are added. A precipitate from the reaction mixture is collected by filtration. Recrystallization of the material from ethanol yields 2-chloro-N-(β-hydroxy-α-methyl-β-phenylphenethyl)acetamide, M.P. 180° C. Further purification is effected by recrystallization from methanol, M.P. 181–181.5° C.

*Example IX*

A solution of 4.9 g. (0.086 mole) of potassium hydroxide and 13.0 g. (0.043 mole) of 2-chloro-N-(β-hydroxy-α-methyl-β-phenylphenethyl)acetamide in methanol is stirred for 18 hours. The solvent is evaporated under vacuum and the residue is recrystallized from benzene to yield white, crystalline 5-methyl-6,6-diphenyl-3-morpholinone, M.P. 248–255° C. Further recrystallization from benzene yields a purer product that melts at 265–266° C.

*Example X*

A solution of 9.4 g. (0.236 mole) of sodium hydroxide in 50 ml. of water is added to a solution of 25 g. (0.118 mole of dl-erythro-1,2-diphenyl-2-aminoethanol in 500 ml. of chloroform. To the cooled and stirred mixture, 13.3 g. (0.118 mole) of chloroacetyl chloride is added dropwise. The heavy precipitate which forms is collected by filtration after 30 minutes. It is recrystallized from methanol to yield purified 2-chloro-N-(β-hydroxy-α-phenylphenethyl)acetamide, M.P. 187–189° C.

*Example XI*

To a solution of 2.73 g. (0.0245 mole) of potassium t-butoxide in 450 ml. of t-butanol is added 7.0 g. (0.0245 mole) of 2-chloro-N-(β-hydroxy-α-phenylphenethyl)acetamide. The mixture is stirred and warmed for several hours and stored in the cold for 16 hours. The solvent is evaporated under reduced pressure and the residue is dissolved in methylene chloride. The solution is washed twice with water, dried over magnesium sulfate and concentrated to dryness. The residual solid (5.7 g.) is recrystallized from benzene to yield pure 5,6-diphenyl-3-morpholinone, M.P. 182–183° C.

*Example XII*

α-(1 - aminoethyl)-p-chlorobenzyl alcohol hydrochloride (28.1 g., 0.127 mole) is dissolved in a mixture of 300 ml. of methylene chloride and 220 ml. of 5% aqueous sodium hydroxide. The solution is stirred and cooled in an ice-salt bath. Chloroacetyl chloride (21.5 g., 0.191 mole) is dropped into the reaction mixture. After 15 minutes the reaction is stopped. The alkaline layer is separated and discarded and the methylene chloride layer is washed with 1 N hydrochloric acid. The organics are separated and dried over magnesium sulfate and concentrated, yielding a crude product, M.P. 87–91° C. Recrystallization from ethyl acetate yields 2-chloro-N-(p-chloro-β-hydroxy-α-methylphenethyl)acetamide, M.P. 92–94° C.

*Example XIII*

2 - chloro-N-(p-chloro-β-hydroxy-α-methylphenethyl)-acetamide (24.3 g., 0.093 mole) is added at a moderate rate to a solution of potassium t-butoxide [made by reacting potassium (7.25 g., 0.186 g.-atom) with excess dry t-butyl alcohol] in 750 ml. dry t-butanol. The reaction is stirred overnight at room temperature. The reaction mixture is concentrated under reduced pressure to remove the t-butanol. The residue is dissolved in methylene chloride and water. The organics are separated, dried over magnesium sulfate and concentrated, yielding an oil which crystallizes. Recrystallization from ethyl acetate yields 6 - (p-chlorophenyl) - 5-methyl-3-morpholinone, M.P. 146–148.5° C.

*Example XIV*

A solution containing 13.2 g. of ephedrine in 100 ml. of methylene chloride is mixed with 100 ml. of 15 percent aqueous sodium hydroxide. The mixture is cooled in an ice bath and with rapid stirring treated with 17.1 g. of α-chlorophenylacetyl chloride. After 15 hours stirring at room temperature, the layers are separated and the aqueous phase is extracted with methylene chloride. The combined organic solution is washed with dilute hydrochloric acid and water, dried over anhydrous magnesium sulfate and concentrated to dryness. The residual oil is largely 2-chloro-N-(β-hydroxy-α-methylphenethyl)-N-methyl-2-phenylacetamide as shown by its infrared spectrum.

*Example XV*

A solution of 16.6 g. of 2-chloro-N-(β-hydroxy-α-methylphenethyl)-N-methyl-2-phenylacetamide in 100 ml. of 95 percent ethanol is added with stirring to a solution of 4.0 g. of potassium hydroxide in 100 ml. of ethanol. After stirring at room temperature for 5 hours, the mixture is filtered and the filtrate is concentrated to dryness. Distillation of the residual oil provides pure 4,5-dimethyl-2,6 -diphenyl - 3 - morpholinone, boiling at 172–176° C. (0.05 mm.).

*Example XVI*

(A) To 10.0 g. of 5-methyl-6-phenyl-3-morpholinone dissolved in 100 ml. of benzene is added 2.6 g. of 50 percent sodium hydride in oil. After stirring the mixture at room temperature for 3 hours and heating under reflux for 1 hour, the theoretical amount of hydrogen evolves. A solution containing 0.11 mole of diethylaminoethyl chloride in 250 ml. of dry benzene is then added and heating under reflux is continued for 15 hours. After cooling, the benzene solution is extracted twice with dilute hydrochloric acid. The aqueous phase is made basic and extracted three times with ether. After drying over anhydrous magnesium sulfate and filtration, the ether solution is concentrated to dryness giving the basic product as an oil. Conversion to the hydrochloride with dry hydrogen chloride in ether followed by two recrystallizations from ethanol-ether yields pure 4-diethylaminoethyl-5-methyl-6-phenyl - 3 - morpholinone hydrochloride, M.P. 224–225.5° C.

(B) By following the procedure of Example XVI-A, but substituting an equivalent quantity of ethylenimine and 3-methylaminopropyl chloride, respectively, for the diethylaminoethyl chloride used therein, the corresponding 4-aminoalkyl derivatives of 5-methyl-6-phenyl-3-morpholinone are obtained.

*Example XVII*

Sodium hydride (4.5 g., 0.09 mole, 50 percent dispersion in mineral oil) is washed three times with dry benzene to remove the mineral oil. Then 50 ml. of dry benzene is added and the reaction is stirred. α-Aminomethyl-p-chlorobenzyl alcohol (10 g., 0.06 mole) is dissolved in 75 ml. of dry benzene and slowly added to the hydride slurry. The reaction mixture is then stirred for one hour. Ethyl chloroacetate (7.5 g., 0.06 mole) is added dropwise. The reaction is stirred two hours. Water is added to decompose the hydride, and the reaction mixture is stirred overnight. The benzene layer is separated from the alkaline layer and washed with dilute hydrochloric acid. The organics are dried over magnesium sulfate and concentrated, yielding a gummy oil. Trituration with benzene-ether yields a crude solid, M.P. 142.5–147.5° C. Recrystallization of a sample of this solid from benzene yields 6-(p-chlorophenyl)-3-morpholinone, M.P. 148.5–150° C.

*Example XVIII*

α-Aminomethyl-3,4,5-trimethoxybenzylalcohol (6.57 g., 0.028 mole) is dissolved in 70 ml. of methylene chloride and 40 ml. of 10 percent aqueous sodium hydroxide. The solution is cooled and stirred. Chloroacetyl chloride (3.5 g., 0.031 mole) is added dropwise. The reaction is stirred for 30 minutes. The methylene chloride layer is separated, washed with dilute hydrochloric acid, dried over magnesium sulfate and concentrated, yielding 2-chloro-N-(β - hydroxy-3,4,5-trimethoxyphenethyl)-acetamide, M.P. 111–112° C.

*Example XIX*

2 - chloro - N-(β-hydroxy-3,4,5-trimethoxyphenethyl)-acetamide (13.8 g., 0.046 mole) is added at a moderate rate to a solution of potassium t-butoxide [made by reacting potassium (3.74 g., 0.096 mole) with excess dry t-butanol] in 350 ml. of dry t-butanol. The reaction mixture is stirred over the weekend. Then the reaction mixture is concentrated to remove the t-butanol. The residue is dissolved in water and methylene chloride. The organic layer is separated, dried over magnesium sulfate and concentrated yielding a crude product, M.P. 159.5–161° C. Recrystallization from ethyl acetate yields 6-(3, 4,5 - trimethoxyphenyl) - 3 - morpholinone, M.P. 161.5–161.8° C.

*Example XX*

A sodium hydride dispersion in oil (5.1 g. of 50% dispersion) is washed three times with 200 ml. portions of dry benzene and left suspended in 200 ml. of dry benzene. To this mixture are added with stirring 10.0 g. of 5-methyl-6-phenyl-3-morpholinone. After reaction is complete (1 hr.), a solution of 8.4 g. of acetyl chloride in 80 ml. of dry benzene is added slowly. The resulting mixture is stirred for 15 hrs., extracted with water and dilute sodium bicarbonate solution, dried over anhydrous magnesium sulfate, filtered and concentrated to dryness. Distillation of the residual oil provides pure 4-acetyl-5-methyl-6-phenyl-3-morpholinone, B.P. 108–129° C. (0.06–0.08 mm.).

Example XXI

A sodium hydride dispersion in oil (7.5 g., 0.16 mole) is washed three times with 200 ml. portions of dry benzene and is suspended in 200 ml. of dry benzene. To this mixture are added with stirring 15.0 g. (0.79 mole) of 5-methyl-6-phenyl-3-morpholinone. After the reaction is complete (1 hr.), a solution of 16.7 g. (0.16 mole) of isobutyryl chloride in 150 ml. of benzene is added slowly. The resulting mixture is stirred 15 hrs., extracted with water and dilute aqueous sodium bicarbonate solution, dried over anhydrous magnesium sulfate, filtered and concentrated to dryness. Distillation of the residual oil provides pure 4 - isobutyryl - 5 - methyl-6-phenyl-3-morpholinone, B.P. 126–128° C. (0.06 mm.).

Example XXII

A sodium hydride dispersion in oil (4.32 g. of 50% dispersion) is washed three times with 150 ml. portions of dry benzene and is suspended in 200 ml. of dry benzene. To this mixture is added with stirring 15.0 g. of 5-methyl-6-phenyl-3-morpholinone. After reaction is complete (1 hr.), a solution of 12.0 g. of benzoyl chloride in 100 ml. of dry benzene is added. The resulting mixture is stirred for 4 hrs., extracted with water and dilute sodium bicarbonate solution, dried over anhydrous magnesium sulfate, filtered and concentrated to dryness. Trituration of the residual oily product with ether provides a crystalline solid. Two recrystallizations from ethyl acetate-hexane and one from benzene-hexane yields pure 4-benzoyl-5-methyl-6-phenyl-3-morpholinone, M.P. 119.5–124.5° C.

Example XXIII

Sodium hydride (2.78 g., 0.058 mole, 50% dispersion in mineral oil) is washed three times with dry monoglyme. Monoglyme (100 ml.) is added and the slurry is stirred. 5-methyl-6-phenyl-3-morpholinone (10 g., 0.052 mole) is added. The mixture is stirred and heated 30 minutes, after which hydrogen evolution ceases. Butyl bromide (7.95 g., 0.058 mole) is added slowly. The reaction mixture is heated under reflux for one hour and then stirred at room temperature overnight. It is then heated under reflux an additional 1.5 hours. Water and ether are added and the layers separated. The aqueous layer is extracted again with ether. The combined organics are dried over magnesium sulfate and concentrated, yielding an oil. Distillation yields 4-butyl-5-methyl-6-phenyl-3-morpholinone, B.P. 115° C. (0.03 mm.).

Example XXIV

Sodium hydride (2.88 g., 0.06 mole, 50 percent dispersion in mineral oil) is washed three times with dry distilled monoglyme (distilled over lithium aluminum hydride). Then 100 ml. monoglyme is added. The slurry is stirred. 6-phenyl-3-morpholinone (9.6 g., 0.054 mole) is added, and the reaction stirred until hydrogen evolution ceases (30–45 min.). Additional solvent is added because a voluminous precipitate forms. Butyl bromide (8.2 g., 0.06 mole) is added and the reaction is heated under reflux for 4.75 hours. The reaction is then stirred overnight at room temperature. Then water is added. The mixture is extracted twice with ether. The combined organics are dried over magnesium sulfate and concentrated, yielding a crude oil. Distillation yields 4-butyl-6-phenyl-3-morpholinone, B.P. 123–125° C. (0.075 mm.).

Example XXV

α-Aminomethyl-p-trifluoromethylbenzyl alcohol (5 g., 0.024 mole) is dissolved in 50 ml. of methylene chloride and 30 ml. of 15 percent aqueous sodium hydroxide. The solution is cooled and stirred. Chloroacetyl chloride (4.2 g., 0.037 mole) in 42 ml. of methylene chloride is added dropwise into the reaction mixture. After stirring for 0.5 hour, the organic layer is separated and washed with 1 N hydrochloric acid. The organics are dried over magnesium sulfate and concentrated, yielding 2-chloro-N-(β-hydroxy - p - trifluoromethylphenethyl) - acetamide. M.P. 92.5–95° C.

Example XXVI

Potassium t-butoxide (commercial) (12.4 g., 0.11 mole) is dissolved in 500 ml. of dry t-butanol. 2-chloro-N-(β-hydroxy-p-trifluoromethylphenethyl)acetamide (11 g., 0.039 mole) is added at a moderate rate to the butanol solution. The reaction mixture is stirred overnight, then concentrated to remove the t-butanol. The residue is dissolved in methylene chloride and water. The organics are separated, dried over magnesium sulfate and concentrated. Recrystallization from ethyl acetate yields pure 6-(α,α,α-trifluoro-p-tolyl)-3-morpholinone, M.P. 115.5–116.5° C.

Example XXVII

A solution of ethylmagnesium bromide is prepared by the careful addition of 134 ml. (1.81 mole) of ethyl bromide to a stirred suspension of 45 g. (1.86 mole) of magnesium in 600 ml. of dry ether. When the reaction is complete, 101.4 g. (0.60 mole) of m-trifluoromethylbenzonitrile is added and the dark solution is stirred for 18 hours. The reaction mixture is poured into one liter of cracked ice containing 200 ml. of concentrated hydrochloric acid. The mixture is then heated on a steam bath for 2 hours and cooled to room temperature. The oily layer is extracted into ether. The ether layer is separated and dried over magnesium sulfate. The ether is evaporated in vacuo to yield yellow oily 3'-trifluoromethylpropiophenone, purified by distillation through a short Vegreux column, B.P. 58–60° C. (0.05 mm.).

Example XXVIII

A stream of dry hydrogen chloride is passed at a moderate rate into a solution of 43.3 g., (0.213 mole) of 3'-trifluoromethylpropiophenone in 300 ml. of ether. n-Butyl nitrite (24.1 g., 0.234 mole) is added to the stirred solution over a period of 15 minutes. Hydrogen chloride addition is maintained and continued for 20 minutes after the completion of butyl nitrite addition. The solution is stirred at room temperature for 3 hours. The solvent is evaporated in vacuo, and the resulting crystals are triturated with hexane and collected by filtration, yielding 2-hydroxyimino-3'-trifluoromethylpropiophenone, purified by recrystallization from methylcyclohexane, M.P. 115–116° C.

Example XXIX

Three grams of 10 percent palladium on carbon are added to a solution of 15.1 g. (0.065 mole) of 2-hydroxyimino-3'-trifluoromethylpropiophenone and 7 g. of dry hydrogen chloride in 500 ml. of absolute ethanol. The mixture is hydrogenated at 50 p.s.i. for 17 hours on a Paar shaker. Three equivalents of hydrogen are taken up. The catalyst is removed by filtration and the solvent is evaporated under reduced pressure. The residue is triturated with ether and the white crystals of α-(1-aminoethyl)-m-trifluoromethylbenzyl alcohol hydrochloride are collected by filtration, M.P. 202–204° C., purified by recrystallization from methanol-ether, M.P. 204° C.

Example XXX

To 1.0 g. of α-(1-aminoethyl)-m-trifluoromethylbenzyl alcohol hydrochloride in 10 ml. of dichloromethane and 10 ml. of 15 percent sodium hydroxide is added at room temperature 0.86 g. of chloroacetyl chloride. The mixture is stirred for 1 hour. The layers are separated and the aqueous solution is extracted once with dichloromethane. The combined organic solutions are washed twice with 0.5 N hydrochloric acid, dried over magnesium sulfate, filtered and concentrated. Recrystallization from ether-petroleum ether yields pure 2-chloro-N-(β-hydroxy-α-methyl-m-trifluoromethylphenethyl)acetamide, M.P. 65.5–68.5° C.

Example XXXI

To a solution of 0.76 g. of potassium t-butoxide in 10 ml. of t-butanol is added portionwise 1.0 g. of 2-chloro-N-

($\beta$ - hydroxy-$\alpha$-methyl-m-trifluoromethylphenethyl)acetamide. The solution is stirred at room temperature for 15 hours and is then concentrated. The residue is dissolved in water and dichloromethane and the layers are separated. The aqueous solution is washed once with dichloromethane. The combined organic solutions are washed once with water, dried over magnesium sulfate and concentrated yielding an oily product which crystallizes on standing. Recrystallization from ether-petroleum ether yields pure 5-methyl-6-($\alpha,\alpha,\alpha$-trifluoro-m-tolyl)-3-morpholinone, M.P. 100–101.5° C.

Example XXXII

To 3.2 g. of sodium hydride (54% in oil) (washed with 1,2-dimethoxyethane to remove the mineral oil) in 100 ml. of 1,2-dimethoxyethane is added portionwise 8.4 g. of 5-methyl-6-phenyl-3-morpholinone. The mixture is stirred 10 minutes at room temperature and 20 minutes at reflux and then cooled to room temperature. To this is added 10 g. of p-trifluoromethylbenzoyl chloride in 50 ml. of 1,2-dimethoxyethane and the resultant mixture is allowed to stand at room temperature overnight. After refluxing for 0.5 hours, the reaction mixture is cooled and diluted with a solution of 98 ml. of water and 1.2 ml. of glacial acetic acid. The solution is extracted twice with ether. The organic solution is washed with brine, dried over magnesium sulfate, filtered and concentrated in vacuo. The residual oil is triturated twice with petroleum ether. Trituration with ether-petroleum ether yields a semi-solid. Recrystallization from benzene-hexane yields pure 5-methyl-6-phenyl - 4 - ($\alpha,\alpha,\alpha$-trifluoro-p-toluoyl)-3-morpholinone, M.P. 119.5–120.5° C.

Example XXXIII (A) Sodium hydride (7.7 g., 0.16 mole, 50% dispersion in mineral oil) is washed three times with dry monoglyme to remove the mineral oil. Then 100 ml. of monoglyme is added. 5-methyl-6-phenyl-3-morpholinone (20 g., 0.105 mole) is added. The reaction mixture is stirred for 0.5 hour, then heated under reflux and stirred for an additional 0.5 hour. It is then cooled in an ice bath. p-Chlorobenzoyl chloride (28 g., 0.16 mole) is dissolved in 200 ml. of monoglyme and added slowly to the reaction mixture. The reaction mixture is stirred overnight, then concentrated to remove the monoglyme. The residue is dissolved in benzene and water containing a few drops of acetic acid. The organic layer is separated and the aqueous layer is washed again with benzene. The combined organics are dried over magnesium sulfate and concentrated, yielding an oil. The oil is triturated with ether and hexane, yielding p-chlorobenzoic anhydride. The mother liquors crystallize upon standing. Filtration yields a crude solid, M.P. 104–111° C. Recrystallization from ethyl acetate yields pure 4-(p-chlorobenzoyl)-5-methyl-6-phenyl-3-morpholinone, M.P. 113–114° C.

(B) The procedure of Example XXXIII–A is followed, except that an equivalent quantity of 6-(p-chlorophenyl)-5-methyl-4H-1,4-oxazin-3(2H)one (Example XLI–A) and 5 - methyl-6-phenyl-4H-1,4-oxazin - 3(2H)one (Example XLVII), respectively, are used in place of the 5-methyl-6-phenyl-3-morpholinone therein to yield the corresponding 4-(p-chlorobenzoyl) derivatives thereof.

Example XXXIV

Grignard reagent is prepared by adding 134 ml. of ethyl bromide in 300 ml. of ether to 45 g. of magnesium in 100 ml. of ether and allowing the mixture to reflux vigorously. The Grignard solution is cooled to room temperature and treated with a solution of 101.4 g. of p-trifluoromethylbenzonitrile in 200 ml. of ether. The reaction is stirred for 4 hours and allowed to stand at room temperature for 15 hours. The Grignard mixture is hydrolyzed by adding it cautiously to 2 liters of crushed ice and 200 ml. of concentrated hydrochloric acid. After filtering to remove excess magnesium, the solution is heated for 2 hours on a steam cone. It is then cooled and extracted three times with ether. The ether extracts are washed with brine, dried over magnesium sulfate, filtered and concentrated to yield 4'-trifluoromethylpropiophenone, a low-melting solid.

Example XXXV

To 112 g. of 4'-trifluoromethylpropiophenone in 750 parts of ether is passed in rapidly, for 20 minutes with cooling, dry hydrogen chloride gas. Addition of the gas continues while 59.5 g. of butyl nitrite is added over a period of 15 minutes. Hydrogen chloride addition continues for 20 minutes, and the solution is allowed to stand at room temperature for 15 hours. The solution is concentrated to low volume and diluted with petroleum ether. The crystals are filtered, washed with petroleum ether and air-dried to yield 2-hydroxyamino - 4' - trifluoromethylpropiophenone, M.P. 134–137° C. From the mother liquor, additional product may also be obtained.

Example XXXVI

A mixture of 30 g. of 2-hydroxyimino-4'-trifluoromethylpropiophenone, 6 g. of 10 percent palladium-on-carbon and 500 ml. of 2 N hydrochloric acid in ethanol is hydrogenated on a Paar shaker. The theoretical amount of hydrogen is consumed in 18 minutes and the reduction is stopped. The mixture is warmed and filtered, and the catalyst is washed 6 times with hot 95 percent ethanol. The filtrate is concentrated to low volume in vacuo and the crystalline hydrochloride is collected by filtration yielding, pure 2-amino-4'-trifluoromethylpropiophenone hydrochloride, M.P. 255–256° C.

Example XXXVII

A mixture of 27.3 g. of 2-amino-4'-trifluoromethylpropiophenone hydrochloride, 6 g. of 10 percent palladium-on-carbon, and 50 percent alcoholic 2 N hydrochloric acid is hydrogenated on a Paar shaker. The reaction is complete within 35 minutes and the mixture is filtered. The catalyst is washed thoroughly with ethanol, and the filtrate is concentrated to low volume in vacuo. The crystalline product is collected by filtration, washed with ether and dried over calcium chloride, yielding purified $\alpha$-(1-aminoethyl)-p - trifluoromethylbenzyl alcohol hydrochloride, M.P. 240–250° C.

Example XXXVIII

To 10 g. of $\alpha$-(1-aminoethyl)-p-trifluoromethylbenzyl alcohol hydrochloride in 100 ml. of 15 percent sodium hydroxide and 100 ml. of dichloromethane, cooled in an ice bath, is added 6.8 g. of chloroacetyl chloride. The mixture is stirred at room temperature for 15 hours. The layers are separated and the aqueous solution washed once with dichloromethane. The combined organic solutions are washed twice with 0.5 N hydrochloric acid, dried over magnesium sulfate, filtered and concentrated in vacuo, yielding purified 2-chloro-N-($\beta$-hydroxy-$\alpha$-methyl-p - trifluoromethylphenethyl)acetamide, M.P. 93–95° C.

Example XXXIX

To a solution of 8.05 g. of potassium t-butoxide in 100 ml. of t-butanol is added portionwise with stirring at room temperature 10.7 g. of 2-chloro-N-($\beta$-hydroxy-$\alpha$-methyl-p - trifluoromethylphenethyl)acetamide. The mixture is stirred at room temperature for 15 hours and then concentrated in vacuo. The residue is dissolved in water and dichloromethane and the layers are separated. The aqueous solution is extracted with dichloromethane and ethyl acetate. The combined organic solutions are washed once with water and concentrated in vacuo. The product crystallizes and is recrystallized from ether-petroleum ether, yielding pure 5-methyl-6-($\alpha,\alpha,\alpha$-trifluoro-p-tolyl)-3-morpholinone, M.P. 127.5–129° C.

Example XL (A) 2-amino-4' - chloropropiophenone hydrochloride (2.5 g., 0.011 mole) is dissolved in 20 ml. of water and 25 g. of ice. Chloroacetyl chloride (2.5 g., 0.022 mole) is combined with a concentrated solution of sodium acetate (4.5 g., 0.055 mole) in water. The mixture is added all at once to the amine hydrochloride. The reaction is stirred 2 hours (crystals begin to form immediately), by which time it has reached room temperature. The reaction mixture is filtered, yielding wet crystals. Drying yields crude solid. Recrystallization of a portion of this solid from ethyl acetate yields 2-chloroacetamido-4' - chloropropiophenone, M.P. 104.5–105.5° C.

(B) In accordance with the procedure of Example XL–A, but utilizing an equivalent quantity of 2-amino-4'-trifluoromethyl - propiophenone hydrochloride, $\omega$ - aminoacetophenone hydrochloride and 2-amino - 3',4',5' - trimethoxypropiophenone hydrochloride, respectively, for the 2-amino-4'-chloropropiophenone hydrochloride therein, there are obtained as the corresponding products: 2-chloracetamido-4' - trifluoromethyl - propiophenone, $\omega$-chloroacetamidoacetophenone, and 2-chloracetamido - 3',4',5'-trimethoxy-propiophenone.

*Example XLI*

(A) Basic ion exchange resin (IRA–400, chloride form, 60 g.) is made into the hydroxyl form by stirring 45 minutes with excess 10 percent aqueous sodium hydroxide. The resin is then washed with water until the washings are neutral to pH paper. Then the resin is washed thoroughly with methanol to remove as much water as possible. The resin is suspended in 400 ml. of methanol and stirred. 2-chloracetamido-4'-chloropropiophenone (1.2 g., 0.005 mole) is added. The reaction mixture is stirred overnight, then filtered. The resin is washed several times with methanol. The filtrate is concentrated, yielding an oil. Trituration with ether yields a crude solid. Recrystallization from chloroform yields 6-(p-chlorophenyl)-5-methyl-4H-1, 4-oxazin-3(2H)one, M.P. 205–207° C.

(B) In accordance with the procedure of Example XLI–A, but utilizing an equivalent quantity of the respective products obtained in Example XL–B for the 2-chloracetamido-4'-chloropropiophenone of Example XLI–A, the following products are obtained: 6-(p-trifluoromethylphenyl)-5-methyl-4H-1,4-oxazin-3(2H)one, 6-phenyl-4H-1,4-oxazin-3(2H)one, and 6-(3',4',5'-trimethoxyphenyl)-5-methyl-4H-1,4-oxazin-3(2H)one.

*Example XLII*

6-($\alpha,\alpha,\alpha$-trifluoro-p-tolyl)-3-morpholinone (5 g., 0.022 mole) and benzoic anhydride (4.6 g., 0.022 mole) are combined in 100 ml. of xylene. A catalytic amount of p-toluenesulfonic acid is added. The reaction is heated under reflux overnight. Then the reaction mixture is cooled and washed with dilute aqueous sodium hydroxide. The organics are dried over magnesium sulfate and concentrated, yielding an oil. Trituration with petroleum ether yields a crude solid, M.P. 148.5–152° C. Recrystallization from ethyl acetate yields 4-benzoyl-6-($\alpha,\alpha,\alpha$-trifluoro-p-tolyl)-3-morpholinone, M.P. 156–157° C.

*Example XLIII*

(A) Norephedrine (5.0 g., 0.033 mole) is dissolved in 50 ml. of methylene chloride and 30 ml. of 10% aqueous sodium hydroxide. The solution is cooled in an ice bath and stirred. Dichloroacetyl chloride (5.35 g., 0.036 mole) is dissolved in 20 ml. of methylene chloride and dropped slowly into the reaction flask. The mixture is then stirred for 20 minutes. The methylene chloride layer is separated and washed with 1 N HCl. The organics are dried with magnesium sulfate and concentrated, yielding white crystals, M.P. 90.5–92.5° C. Recrystallization of a portion yields pure 2,2-dichloro-N-($\beta$-hydroxy-$\alpha$-methylphenethyl)-acetamide, M.P. 96–97° C.

(B) In accordance with the procedure of Example XLIII–A, but utilizing an equivalent quantity of $\alpha$-(1-methylaminoethyl) - benzyl alcohol, $\alpha$-(1 - aminoethyl) benzhydrol, dl - erythro - 1,2 - diphenyl-2-aminoethanol, $\alpha$ - aminomethyl - 3,4,5 - trimethoxybenzyl alcohol and $\alpha$-aminomethyl - p-trifluoromethylbenzyl alcohol, respectively, for the norephedrine therein, there are obtained as the corresponding products:

2,2 - dichloro - N - methyl-N-($\beta$-hydroxy-$\alpha$-methylphenethyl) acetamide,
2,2-dichloro-N-($\beta$-phenyl - $\beta$-hydroxy-$\alpha$-methylphenethyl) acetamide,
2,2-dichloro-N-($\beta$-hydroxy-$\alpha$ - phenyl-$\alpha$-methylphenethyl) acetamide,
2,2-dichloro-N-($\beta$ - hydroxy-3,4,5-trimethoxyphenethyl) acetamide, and
2,2 - dichloro-N-($\beta$-hydroxy-p-trifluoromethylphenethyl) acetamide.

*Example XLIV*

(A) 2,2 - dichloro-N-($\beta$-hydroxy-$\alpha$-methylphenethyl) acetamide (8.5 g., 0.033 mole) is combined with morpholine (5.8 g., 0.066 mole) in 100 ml. of toluene. The reaction is stirred and heated under reflux overnight. Crystals of morpholine hydrochloride are deposited continually throughout the course of the reaction. The reaction mixture is then allowed to cool to room temperature. Filtration yields 5 g. of morpholine hydrochloride. The filtrate is cooled in an ice bath and ether is added. The resulting solid is removed by filtration, yielding an impure product, M.P. 195–197° C. Recrystallization from ethanol yields pure 2-morpholino-5-methyl-6-phenyl-3-morpholinone, M.P. 212–215° C.

(B) In accordance with the procedure of Example XLIV–A, but utilizing an equivalent quantity of the respective products obtained in Example XLIII–B for the 2,2 - dichloro-N-($\beta$-hydroxy-$\alpha$-methylphenethyl)acetamide of Example XLIV–A, the following products are obtained:

2-morpholino-4,5-dimethyl-6-phenyl-3-morpholinone,
2-morpholino-5-methyl-6,6-diphenyl-3-morpholinone,
2-morpholino-5,6-diphenyl-3-morpholinone,
2 - morpholino-6-(3',4',5'-trimethoxyphenyl)-3-morpholinone, and
2-morpholino-6-(p-trifluoromethylphenyl) - 3 - morpholinone.

*Example XLV*

(A) 2 - morpholino-5-methyl-6-phenyl-3-morpholinone (1 g., 0.0036 mole) is suspended in 0.1 N HCl (36 ml., 0.0036 mole). The suspension is put in a shaker overnight. The resulting suspension is filtered, yielding 2 - hydroxy - 5 - methyl-6-phenyl-3-morpholinone, M.P. 197–198.5° C.

(B) In accordance with the procedure of Example XLV–A, but utilizing an equivalent quantity of the respective products obtained in Example XLIV–B for the 2 - morpholino - 5 - methyl-6-phenyl-3-morpholinone of Example XLV–A, the following 2-hydroxy derivatives are obtained:

2-hydroxy-4,5-dimethyl-6-phenyl-3-morpholinone,
2-hydroxy-5-methyl-6,6-diphenyl-3-morpholinone,
2-hydroxy-5,6-diphenyl-3-morpholinone,
2 - hydroxy - 6 - (3',4',5'-trimethoxyphenyl)-3-morpholinone, and
2 - hydroxy-6-(p-trifluoromethylphenyl)-3-morpholinone.

*Example XLVI*

2-aminopropiophenone hydrochloride (35.9 g., 0.19 mole) is dissolved in 45 ml. of water and 50 g. of ice is added. The whole flask is cooled in an ice bath. Chloroacetyl chloride (44 g., 0.39 mole) is mixed with a concentrated solution of sodium acetate (79.7 g., 0.97 mole) in water. The mixture is added all at once to the amine hydrochloride. White crystals form immediately. The reaction is stirred one hour and then filtered. The wet product is air-dried, yielding a white solid M.P. 84–85° C. Recrystallization of a portion from ethyl acetate yields pure 2-chloracetamidopropiophenone, M.P. 87–88° C.

Example XLVII (A) Basic ion exchange resin (IRA–400, chloride form, 750 g.) is made into the hydroxyl form by stirring 45 minutes with excess 10% aqueous sodium hydroxide. The resin is then washed with water until the washings are neutral to pH paper. Then the resin is washed thoroughly with methanol to remove as much water as possible. The resin is suspended in 1500 ml. methanol and stirred. 2-chloracetamidopropiophenone (25 g., 0.11 mole) is added. The reaction mixture is stirred overnight, then filtered. The resin is washed several times with methanol. The filtrate is concentrated partially, then filtered, yielding white crystals, M.P. 228–229.5° C. Further evaporation of the filtrate yields a crude solid. Recrystallization from ethanol yields pure 5-methyl-6-phenyl-4H-1,4-oxazin-3(2H)one, M.P. 227–229° C.

(B) Alkylation of the foregoing product with butyl bromide according to the procedure of Example XXIII affords the corresponding 4-butyl derivative of 5-methyl-6-phenyl-4H-1,4-oxazin-3(2H)one.

Example XLVIII

4'-benzyloxypropiophenone (178 g., 0.74 mole) is suspended in one liter of anhydrous ether and stirred. While hydrogen chloride gas is bubbled in, butyl nitrite (84 g., 0.81 mole) is added slowly (over a 1 hour period). The gas is bubbled in 10 minutes longer. The ketone goes into solution during the course of the addition; a precipitate begins to form after 0.5 hour. The reaction is stirred overnight, then filtered, yielding an impure product. Recrystallization from ethanol yields $\alpha$-hydroxyimino-4'-benzyloxypropiophenone, M.P. 137–138° C. Concentration of the ether solution of the reaction mixture yields additional crude product. Recrystallization from ethanol yields $\alpha$-hydroxyimino-4'-benzyloxypropiophenone, M.P. 138–139° C.

Example XLIX $\alpha$-Hydroxyimino - 4' - benzloxypropiophenone (10 g., 0.037 mole) is hydrogenated in 150 ml. of glacial acetic acid at 50 pounds pressure over one spoonful of washed nickel catalyst. The hydrogenation is run overnight. Three equivalents of hydrogen are taken up. The reaction mixture is filtered. The catalyst is washed several times with ethanol. The filtrate is concentrated, yielding an oil which crystallizes upon scratching, yielding a crude product (acetate salt). The crude solid is dissolved in dilute sodium hydroxide and extracted twice with methylene chloride. The organics are dried over magnesium sulfate and concentrated, yielding crude $\alpha$-(1-amino-ethyl) p-benzyloxybenzyl alcohol, M.P. 114–121.5° C. A sample is converted to the hydrochloride salt, M.P. 195–200° C.

Example L $\alpha$-(1-aminoethyl)-p-benzyloxybenzyl alcohol (28 g., 0.088 mole) is dissolved in 200 ml. of methylene chloride and 100 ml. of 15% aqueous sodium hydroxide. The solution is cooled and stirred. Chloroacetyl chloride (11 g., 0.097 mole) is dissolved in 110 ml. of methylene chloride and added dropwise into the solution. The reaction mixture is stirred for 1.5 hours. The aqueous layer is acidified (this procedure is carried out because a thick emulsion formed with base and methylene chloride). The organic layer is separated. The acidic layer is washed with methylene chloride. The combined organics are washed with dilute sodium hydroxide. The organics are dried over magnesium sulfate and concentrated, yielding a crude solid. Recrystallization from carbon tetrachloride yields 2 - chloro-N-(p-benzyloxy-$\beta$-hydroxy-$\alpha$-methylphenethyl)acetamide, M.P. 123–124.5° C.

Example LI

2 - chloro - N - (p - benzyloxy - $\beta$ - hydroxy - $\alpha$ - methylphenethyl)acetamide (12 g., 0.036 mole) is added to a solution of potassium t-butoxide (commercial, 9.1 g., 0.081 mole) in 500 ml. of dry t-butanol. The reaction is stirred overnight, then concentrated to dryness. The residue is dissolved in water and methylene chloride. The methylene chloride layer is separated, dried and concentrated, yielding a crude solid. Recrystallization from chloroform twice yields pure 6-(p-benzyloxyphenyl)-5-methyl-3-morpholinone, M.P. 181.5–182.5° C.

Example LII 5-(p-benzyloxyphenyl)-5-methyl-3-morpholinone (8.2 g., 0.028 mole) is hydrogenated in 150 ml. ethanol at 50 pounds pressure over 0.82 g. of 10% palladium on carbon. When hydrogen takeup ceases, the reaction mixture is removed and filtered. The catalyst is washed several times with ethanol. The filtrate is concentrated, yielding a crude product, M.P. 226.5–230.5° C. Recrystallization from water yields pure 6-(p-hydroxyphenyl)-5-methyl-3-morpholinone, M.P. 240.5–242.0° C.

Example LIII (A) An intimate mixture of 10.0 g. (0.0523 mole) of cis-5-methyl-6-phenyl-3-morpholinone and 4.7 g. (0.0212 mole) of phosphorous pentasulfide is treated with 10 ml. of pyridine, and the resultant dark viscous mass is stirred for 20 minutes on a steam bath. The mixture is poured into water and the solid is collected by filtration. The solid is washed with cold ether-ethanol (50:50). It is recrystallized three times from benzene, yielding a white powdery cis-5-methyl-6-phenyl-morpholine-3-thione; M.P. 160–161° C.

(B) The procedure of Example LIII–A is followed except that an equivalent quantity of 5-methyl-6,6-diphenyl - 3 - morpholinone, 5,6-diphenyl-3-morpholinone, 4,5-dimethyl-6-phenyl-3-morpholinone, 4-butyl-5-methyl-6-phenyl - 3 - morpholinone, 4-butyl-6-phenyl-3-morpholinone, 6-(p-trifluoromethylphenyl)-3-morpholinone and 6 - (p - chlorophenyl) - 5 - methyl - 4H - 1,4 - oxazin-3(2H)-one, respectively, is used in place of the 5-methyl-6-phenyl-3-morpholinone used therein to yield as products the corresponding morpholine-3-thiones.

Example LIV

Magnesium turnings (22.0 g., 0.832 g.-atom) are stirred up in 100 ml. of anhydrous ether. The mixture is cooled. Ethyl bromide (82.4 g., 0.756 mole) is dissolved in 250 ml. of anhydrous ether and is added at a moderate rate. The reaction is stirred for 30 minutes. Then o-trifluoromethylbenzonitrile (43.1 g., 0.252 mole) is dissolved in 50 ml. of anhydrous ether and added. The reaction is stirred overnight. The reaction mixture is then stirred into a mixture of concentrated hydrochloric acid (300 ml.) and ice (1.5 liters). The ether is boiled off. The acid mixture is heated on a steam bath for two hours, during which time a black oil is deposited. The mixture is extracted twice with ether. The ether solution is dried over magnesium sulfate and concentrated, yielding a black oil. Distillation yields 2'-trifluoromethylpropiophenone, B.P. 55–58° C. (0.5 mm.).

Example LV

2'-trifluoromethylpropiophenone (71.0 g., 0.35 mole) is dissolved in 800 ml. of anhydrous ether. Dry hydrogen chloride gas is bubbled into the stirred solution. At the same time, butyl nitrite (40.2 g., 0.39 mole) is added dropwise. The hydrogen chloride gas is bubbled in for twenty minutes after the butyl nitrite addition is completed. The reaction is stirred one hour longer. The reaction mixture is concentrated. The resulting crystals are washed with hexane. Filtration yields pure 2-hydroxyimino-2'-trifluoromethylpropiophenone, M.P. 96–97° C.

Example LVI

2 - hydroxyimino - 2' - trifluoromethylpropiophenone (10.0 g., 0.043 mole) is hydrogenated in 150 ml. of 2 N ethanolic hydrochloric acid at 50 lbs. pressure over 1.0 g.

10% palladium on carbon. The reduction is completed in 2.5 hours. The catalyst is removed by filtration. The filtrate is concentrated and the resulting white crystals are triturated with ether, yielding 2-amino-2'-trifluoromethylpropiophenone hydrochloride, M.P. 223.5–224° C.

Example LVII 2-amino - 2' - trifluoromethylpropiophenone hydrochloride (7.5 g., 0.03 mole) is hydrogenated at 50 pounds pressure in 150 ml. of water plus 5 ml. of concentrated hydrochloric acid over 0.8 g. of 10% palladium on carbon. When the reduction is complete, the catalyst is removed by filtration. The filtrate is concentrated, yielding a crude product, M.P. 237.5–242.5° C. Recrystallization from isopropanol yields α-(1-aminoethyl)-o-trifluoromethylbenzyl alcohol hydrochloride, M.P. 247–250° C.

Example LVIII

α-(1-aminoethyl)-o-trifluoromethylbenzyl alcohol hydrochloride (18.0 g., 0.07 mole) is dissolved in 250 ml. of methylene chloride and 150 ml. of 10% aqueous sodium hydroxide. The solution is cooled in an ice-bath and stirred. Chloroacetyl chloride (8.35 g., 0.078 mole) is dissolved in 85 ml. of methylene chloride and is dropped slowly into the solution. The reaction is stirred 15 minutes. The methylene chloride layer is separated and washed with dilute hydrochloric acid. The organics are dried over magnesium sulfate and concentrated, yielding a colorless oil of slightly impure 2-chloro-N-(β-hydroxy-α-methyl-o-trifluoromethylphenethyl)acetamide.

Example LIX 2 chloro - N - (β - hydroxy - α - methyl - o - trifluoromethylphenethyl)acetamide (20.0 g. slightly impure, 0.07 mole assumed) is added to a solution of potassium t-butoxide [made by reacting potassium (5.5 g., 0.14 mole) with excess, dry t-butyl alcohol] in 500 ml. of dry t-butanol. The reaction is stirred overnight, then concentrated to remove the t-butanol. The residue is dissolved in methylene chloride and water. The methylene chloride layer is separated, dried over magnesium sulfate and concentrated, yielding a crude product, M.P. 137–140° C. Recrystallization from ethyl acetate yields pure 5 - methyl - 6 - (α,α,α - trifluoro - o - tolyl) - 3 - morpholinone, M.P. 142.5–144.5° C.

Example LX

A solution of 5-methyl-6-phenyl-4H-1,4-oxazin-3-(2H)-one (0.20 g., 0.01 mole) in glacial acetic acid (50 ml.) is hydrogenated over palladium catalyst (10% palladium on carbon, 0.04 g.) at fifty pounds pressure. The reaction is shaken overnight. The hydrogen uptake is 1.4 lbs. (theoretical uptake=0.5 lb.). The catalyst is removed by filtration. The filtrate is concentrated to dryness, yielding an oil which crystallizes. The crystals are washed with ether and the ether removed by filtration. The yield is 0.07 g. (35%) of 5-methyl-6-phenyl-3-morpholinone, identical by infrared spectrum and thin layer chromatography to a previously prepared sample.

We claim:
1. The chemical compound:

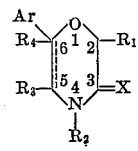

wherein X is a member selected from the group consisting of oxygen and sulfur; $R_1$ is a member selected from the group consisting of hydrogen, hydroxy, lower alkyl and phenyl, provided that, when $R_1$ is hydroxy, said X is oxygen; $R_2$ is a member selected from the group consisting of hydrogen, lower alkyl, amino-lower alkyl, lower alkyl-amino-lower alkyl and acyl, said acyl being a member selected from the group consisting of lower alkanoyl, benzoyl, halobenzoyl and trifluoromethylbenzoyl, provided that, when $R_2$ is such acyl, said X is oxygen and $R_1$ is other than hydroxy; $R_3$ is a member selected from the group consisting of hydrogen, lower alkyl and phenyl; $R_4$ is a member selected from the group consisting of hydrogen, lower alkyl and phenyl; Ar is a member selected from the group consisting of phenyl and phenyl substituted with a member selected from the group consisting of halo, hydroxy, lower alkoxy, benzyloxy and halolower alkyl; and the dotted line between the 5- and 6-carbon atoms indicates the presence of an optional double bond with Ar the sole substituent in the 6-position, provided that, when said double bond is present, $R_1$ is other than hydroxy.

2. 6-aryl-3-morpholinone, said aryl being a member selected from the group consisting of phenyl and phenyl substituted with a member selected from the group consisting of halo, hydroxy, lower alkoxy, benzyloxy and halolower alkyl.

3. 5-lower alkyl-6-aryl-3-morpholinone, said aryl being a member selected from the group consisting of phenyl and phenyl substituted with a member selected from the group consisting of halo, hydroxy, lower alkoxy, benzyloxy and halolower alkyl.

4. 6-halolower alkylphenyl-3-morpholinone.
5. 5-lower alkyl - 6 - halolower alkylphenyl-3-morpholinone.
6. 5-methyl-6-phenyl-3-morpholinone.
7. 6-(p-methoxyphenyl)-3-morpholinone.
8. 2,6-diphenyl-5-methyl-3-morpholinone.
9. 5-methyl-6,6-diphenyl-3-morpholinone.
10. 5,6-diphenyl-3-morpholinone.
11. 6-(p-chlorophenyl)-5-methyl-3-morpholinone.
12. 4,5-dimethyl-2,6-diphenyl-3-morpholinone.
13. 4 - diethylaminoethyl-5-methyl-6-phenyl-3-morpholinone.
14. 6-(3,4,5-trimethoxyphenyl)-3-morpholinone.
15. 4-acetyl-5-methyl-6-phenyl-3-morpholinone.
16. 4-benzoyl-5-methyl-6-phenyl-3-morpholinone.
17. 4-butyl-6-phenyl-3-morpholinone.
18. 6-(α,α,α-trifluoro-p-tolyl)-3-morpholinone.
19. 5 - methyl-6-phenyl-4-(α,α,α-trifluoro-p-toluoyl)-3-morpholinone.
20. 4 - (p-chlorobenzoyl)-5-methyl-6-phenyl-3-morpholinone.
21. 6-(p - chlorophenyl) - 5 - methyl-4H-1,4-oxazin-3-(2H)one.
22. 2-hydroxy-5-methyl-6-phenyl-3-morpholinone.
23. 5-methyl-6-phenyl-4H-1,4-oxazin-3(2H)one.
24. 6-(p-benzyloxyphenyl)-5-methyl-3-morpholinone.
25. 6-(p-hydroxyphenyl)-5-methyl-3-morpholinone.
26. 5-methyl-6-phenylmorpholine-3-thione.

References Cited by the Examiner

UNITED STATES PATENTS 3,231,548   1/1966   Dunn _____ 260—247.7 X

ALEX MAZEL, *Primary Examiner.*

J. TOVAR, *Assistant Examiner.*